US012785367B2

(12) United States Patent
Hu et al.

(10) Patent No.: US 12,785,367 B2
(45) Date of Patent: Nov. 3, 2026

(54) ROTATABLE AND ADJUSTABLE ISOLATION STRUCTURE AND ELECTRICAL DEVICE THEREOF

(71) Applicant: Zhuhai Shengchang Electronics Co., Ltd., Zhuhai City (CN)

(72) Inventors: Jialong Hu, Zhuhai City (CN); Dehua Zheng, Zhuhai City (CN)

(73) Assignee: Zhuhai Shengchang Electronics Co., Ltd., Zhuhai City (CN)

( * ) Notice: Subject to any disclaimer, the term of this patent is extended or adjusted under 35 U.S.C. 154(b) by 356 days.

(21) Appl. No.: 18/743,054

(22) Filed: Jun. 13, 2024

(65) Prior Publication Data

US 2025/0385491 A1 Dec. 18, 2025

(51) Int. Cl.
*H02B 1/14* (2006.01)
*H02G 3/08* (2006.01)

(52) U.S. Cl.
CPC ............... *H02B 1/14* (2013.01); *H02G 3/081* (2013.01)

(58) Field of Classification Search
CPC .................................. H02G 3/081; H02B 1/14
See application file for complete search history.

(56) References Cited

U.S. PATENT DOCUMENTS 4,603,932 A * 8/1986 Heverly ................. H01R 13/44 174/67
5,075,686 A * 12/1991 Shigemura ......... H04N 1/00384 341/23
5,212,899 A * 5/1993 Fandreyer ................. G09F 3/20 40/661.11
5,594,206 A * 1/1997 Klas ......................... H01H 9/18 174/67
5,693,911 A * 12/1997 Sydow ................. H05K 5/0252 283/117
6,642,452 B2 * 11/2003 Masson .................... H02G 3/14 174/67
6,965,078 B1 * 11/2005 Gretz ..................... H02G 3/123 174/64
7,038,132 B1 * 5/2006 Lowe ..................... H02G 3/105 439/535

(Continued)

FOREIGN PATENT DOCUMENTS

CN 205265042 U 5/2016

*Primary Examiner* — Timothy J Thompson
*Assistant Examiner* — Rhadames Alonzo Miller
(74) *Attorney, Agent, or Firm* — Rondaus PLLC; George Liu

(57) ABSTRACT

The present disclosure relates to the technical field of electrical equipment, and in particular to a rotatable and adjustable isolation structure and an electrical device thereof. The isolation structure of the present disclosure comprises: a rotating base is formed on the clamping piece, a rotating disk is formed on the isolation piece, and the rotating disk is detachably connected to the rotating base, whereby the isolation piece divides one side area of the clamping piece into different sections, thereby separating different cables into different sections; and the isolation piece rotates around a central axis of the rotating base with the rotating disk to adjust a shape of the section, and when cables are piled up in a certain area of the section, the isolation piece can be adapted to rotate to provide enough wiring space for the cables to avoid installation difficulties.

10 Claims, 12 Drawing Sheets

(56) References Cited

U.S. PATENT DOCUMENTS

| | | | | | |
|---|---|---|---|---|---|
| 7,115,820 | B1 * | 10/2006 | Gretz | H02G 3/123 | 174/53 |
| 7,241,952 | B2 * | 7/2007 | Dinh | H02G 3/088 | 174/67 |
| 7,374,058 | B2 * | 5/2008 | Dinh | H02G 3/14 | 220/3.8 |
| 7,396,996 | B1 * | 7/2008 | Shotey | H02G 3/14 | 174/67 |
| 7,435,900 | B1 * | 10/2008 | Gretz | H02G 3/126 | 174/53 |
| 7,598,452 | B1 * | 10/2009 | Shotey | H01R 13/652 | 174/67 |
| 7,598,454 | B1 * | 10/2009 | Baldwin | H02G 1/081 | 174/67 |
| 7,619,163 | B1 * | 11/2009 | Shotey | H02G 3/14 | 174/67 |
| 7,626,121 | B1 * | 12/2009 | Cleghorn | H02G 3/14 | 174/67 |
| 7,820,912 | B1 * | 10/2010 | Shotey | H02G 3/12 | 174/67 |
| 7,910,826 | B1 * | 3/2011 | Shotey | H02G 3/126 | 174/64 |
| 7,947,901 | B2 * | 5/2011 | Leopold | H02G 3/088 | 174/67 |
| 8,106,295 | B1 * | 1/2012 | Shotey | H02G 3/14 | 174/67 |
| 8,153,910 | B1 * | 4/2012 | Penczak | H02G 3/185 | 29/897.3 |
| 10,475,596 | B2 * | 11/2019 | Dimberg | H01H 23/04 | |
| 11,283,253 | B1 * | 3/2022 | Herth | H02G 3/12 | |
| 11,444,442 | B1 * | 9/2022 | Herth | H02G 3/081 | |
| 2003/0042038 | A1 * | 3/2003 | Masson | H02G 3/14 | 174/66 |
| 2003/0165653 | A1 * | 9/2003 | Morrison | B32B 7/06 | 283/81 |
| 2005/0150673 | A1 * | 7/2005 | Hill | H02G 3/128 | 174/53 |
| 2005/0207136 | A1 * | 9/2005 | Jasper | H01H 9/182 | 362/253 |
| 2005/0242569 | A1 * | 11/2005 | Morrison | G09F 7/12 | 283/81 |
| 2005/0274538 | A1 * | 12/2005 | Gretz | H02G 3/14 | 174/67 |
| 2006/0016809 | A1 * | 1/2006 | Dinh | H02G 3/14 | 220/835 |
| 2009/0211779 | A1 * | 8/2009 | Drane | H02G 3/14 | 174/67 |
| 2010/0000756 | A1 * | 1/2010 | Peck | H02G 3/18 | 174/53 |
| 2010/0058638 | A1 * | 3/2010 | Askin | H01H 9/18 | 40/661 |
| 2010/0097781 | A1 * | 4/2010 | Combs | G09F 13/04 | 362/95 |
| 2010/0181091 | A1 * | 7/2010 | Drane | H02G 3/14 | 174/66 |
| 2011/0005799 | A1 * | 1/2011 | Drane | H01R 24/78 | 174/54 |
| 2011/0209913 | A1 * | 9/2011 | Green | H02G 3/08 | 174/50 |
| 2012/0048590 | A1 * | 3/2012 | Drane | H02G 3/14 | 174/67 |
| 2012/0180349 | A1 * | 7/2012 | Ekins | H01R 13/465 | 361/807 |
| 2012/0231657 | A1 * | 9/2012 | Bouse | H02G 3/185 | 439/535 |
| 2012/0305307 | A1 * | 12/2012 | Korcz | H02G 3/085 | 174/559 |
| 2013/0148323 | A1 * | 6/2013 | Yang | H01H 9/161 | 200/314 |
| 2014/0000956 | A1 * | 1/2014 | Wurms | H02G 3/08 | 174/535 |
| 2014/0262418 | A1 * | 9/2014 | Korcz | H02G 3/088 | 174/67 |
| 2015/0279243 | A1 * | 10/2015 | Willes | G09F 3/10 | 428/137 |
| 2020/0028340 | A1 * | 1/2020 | Calvert | H02G 3/081 | |
| 2023/0264398 | A1 * | 8/2023 | Green | B29C 45/14311 | 40/574 |
| 2024/0291257 | A1 * | 8/2024 | Holleschau | H02G 3/083 | |

* cited by examiner

ROTATABLE AND ADJUSTABLE ISOLATION STRUCTURE AND ELECTRICAL DEVICE THEREOF

TECHNICAL FIELD

The present disclosure herein relates to the technical field of electrical equipment, and in particular to a rotatable and adjustable isolation structure and an electrical device thereof.

BACKGROUND

Some isolation structures are arranged at the back end of electrical devices (such as dimmers) to isolate input lines and output lines, the current isolation structure is fixedly separate the cavity between the electrical device and the junction box into two accommodation areas, and the input lines and the output lines are arranged in two accommodation areas respectively.

During actual installation process, there is a situation where the input lines or output lines are unevenly arranged in the accommodation area, the input lines or output lines are stacked in a certain area of the accommodation area, and the use of the existing isolation structure that fixedly separates the cavity will cause the size of the area in the accommodation area to be unadjustable, so that installation difficulties may arise.

SUMMARY

In order to achieve the above purpose, the present disclosure provides a rotatable and adjustable isolation structure, comprising:

- a clamping piece, wherein a rotating base is formed on the clamping piece; and
- an isolation piece, wherein one end of the isolation piece is detachably connected to the rotating base via a rotating disk, whereby the isolation piece divides one side area of the clamping piece into different sections, and the isolation piece rotates around a central axis of the rotating base with the rotating disk to change a shape of the section.

In some possible embodiments, the rotating base protrudes from a center of one end of the clamping piece, and the rotating base includes:

- a body, wherein a rotating cavity is formed inside the body;
- a notch, wherein the notch is formed on one side of the body and communicates with the rotating cavity;

the rotating disk includes:

- a rotating portion, wherein the rotating portion is arranged at one end of the isolation piece via a connecting rod; and
- the rotating portion enters from the notch and is accommodated in the rotating cavity.

In some possible embodiments, the rotating portion is in a shape of a cylinder, a ball, a cone or an ellipsoid.

In some possible embodiments, the body includes:

- a first limiting portion, wherein the first limiting portion is in a circular shape and is formed on the clamping piece;
- a second limiting portion, wherein the second limiting portion is arranged at an upper end of the first limiting portion;

- the first limiting portion, the second limiting portion and an end surface of the clamping piece are enclosed to form the rotating cavity;
- the first limiting portion is used to limit the rotating portion from disengaging from the rotating cavity along a width direction of the isolation piece; and
- the second limiting portion is used to limit the rotating portion from disengaging from the rotating cavity along a length direction of the isolation piece.

In some possible embodiments, a limiting arm is further formed on the isolation piece, the limiting arm extends from a lower end of the isolation piece in an inclined direction downwardly along the width direction of the isolation piece until the limiting arm is close to the rotating portion, a distance between a free end of the limiting arm and the end surface of the clamping piece is less than a height of the first limiting portion protruding from the end surface of the clamping piece, and the limiting arm is abutted against an outer surface of the first limiting portion to prevent the rotating portion from disengaging from the rotating cavity through the notch.

In some possible embodiments, a positioning arm is further formed on the isolation piece, the positioning arm extends from the lower end of the isolation piece along the width direction of the isolation piece, a free end of the positioning arm is provided with a positioning portion, and the positioning portion is elastically and press against the end surface of the clamping piece to prevent the isolation piece from rotating relative to the clamping piece.

In some possible embodiments, the end surface of the clamping piece is provided with a positioning groove that matches the positioning portion.

In some possible embodiments, a reinforcing rib is further formed on the isolation piece, and the reinforcing rib extends along the width direction of the isolation piece opposite to both sides of the connecting rod.

In some possible embodiments, a plurality of easy-tear lines is formed on the isolation piece, and the easy-tear lines are arranged along the width direction of the isolation piece.

The present disclosure also provides an electrical device, wherein it comprises the rotatable and adjustable isolation structure as in the above embodiment, at least two terminals are formed on the clamping piece, and at least two of the terminals are arranged within the different sections;

the electrical device further comprises:

- a junction box, the clamping piece is accommodated in the junction box, a cavity that can accommodate cables is formed between the clamping piece and the junction box, and the isolation piece divides the cavity into the different sections.

Compared with the prior art, the beneficial effect of the present disclosure is that: the isolation structure of the present disclosure comprises: a rotating base is formed on the clamping piece, a rotating disk is formed on the isolation piece, and the rotating disk is detachably connected to the rotating base, whereby the isolation piece divides one side area of the clamping piece into different sections, thereby separating different cables into different sections; and the isolation piece rotates around a central axis of the rotating base with the rotating disk to adjust a shape of the section, and when cables are piled up in a certain area of the section, the isolation piece can be adapted to rotate to provide enough wiring space for the cables to avoid installation difficulties.

BRIEF DESCRIPTION OF THE DRAWINGS

In order to explain the technical solutions in the embodiments of the present disclosure more clearly, the drawings needed to be used in the description of the embodiments will be briefly introduced below. Obviously, the drawings in the following description are only some embodiments of the present disclosure, and for those ordinary skilled in the art, other drawings can be obtained based on these drawings without exerting creative efforts.

DETAILED DESCRIPTION OF THE EMBODIMENTS

Figure 1:
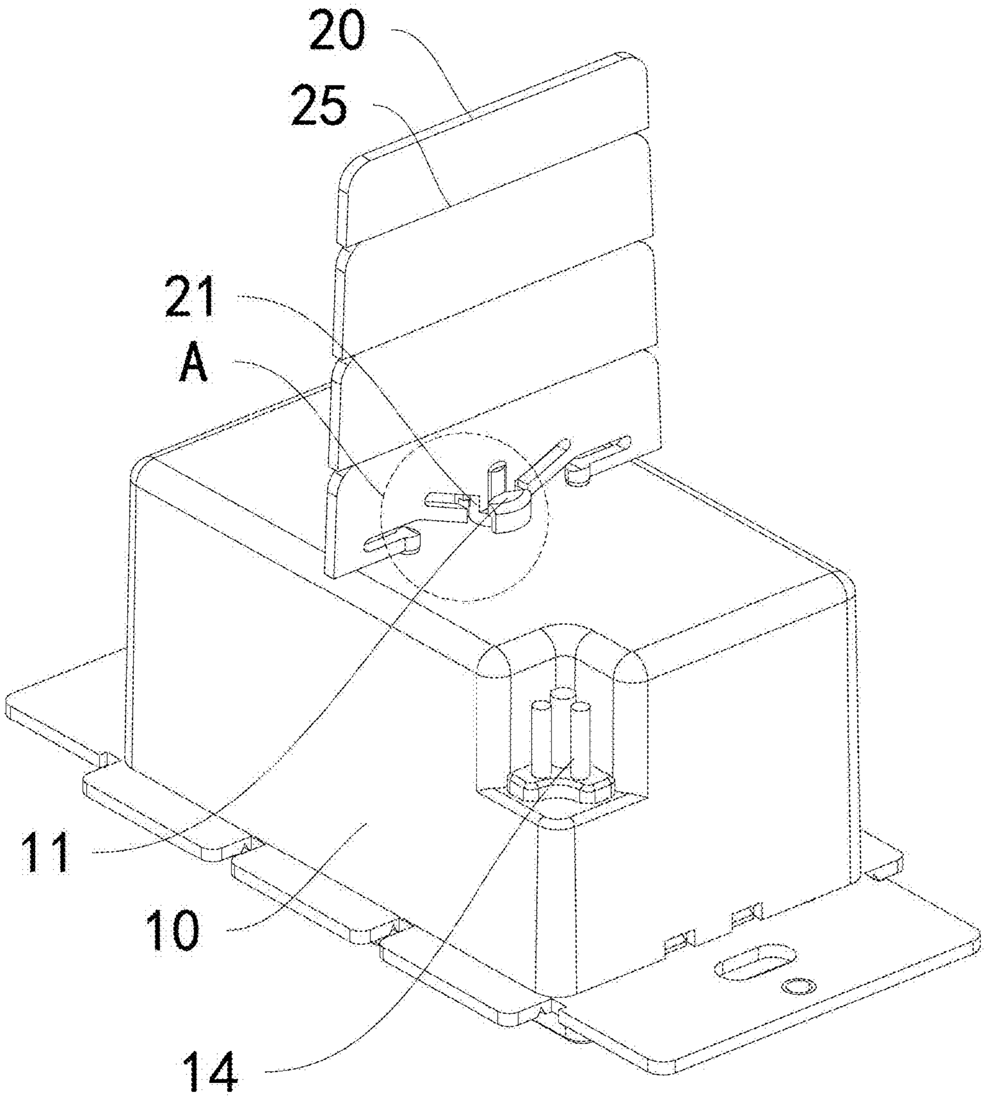
FIG. 1 is a three-dimensional structure diagram from a first perspective provided by the present disclosure.
Figure 2:
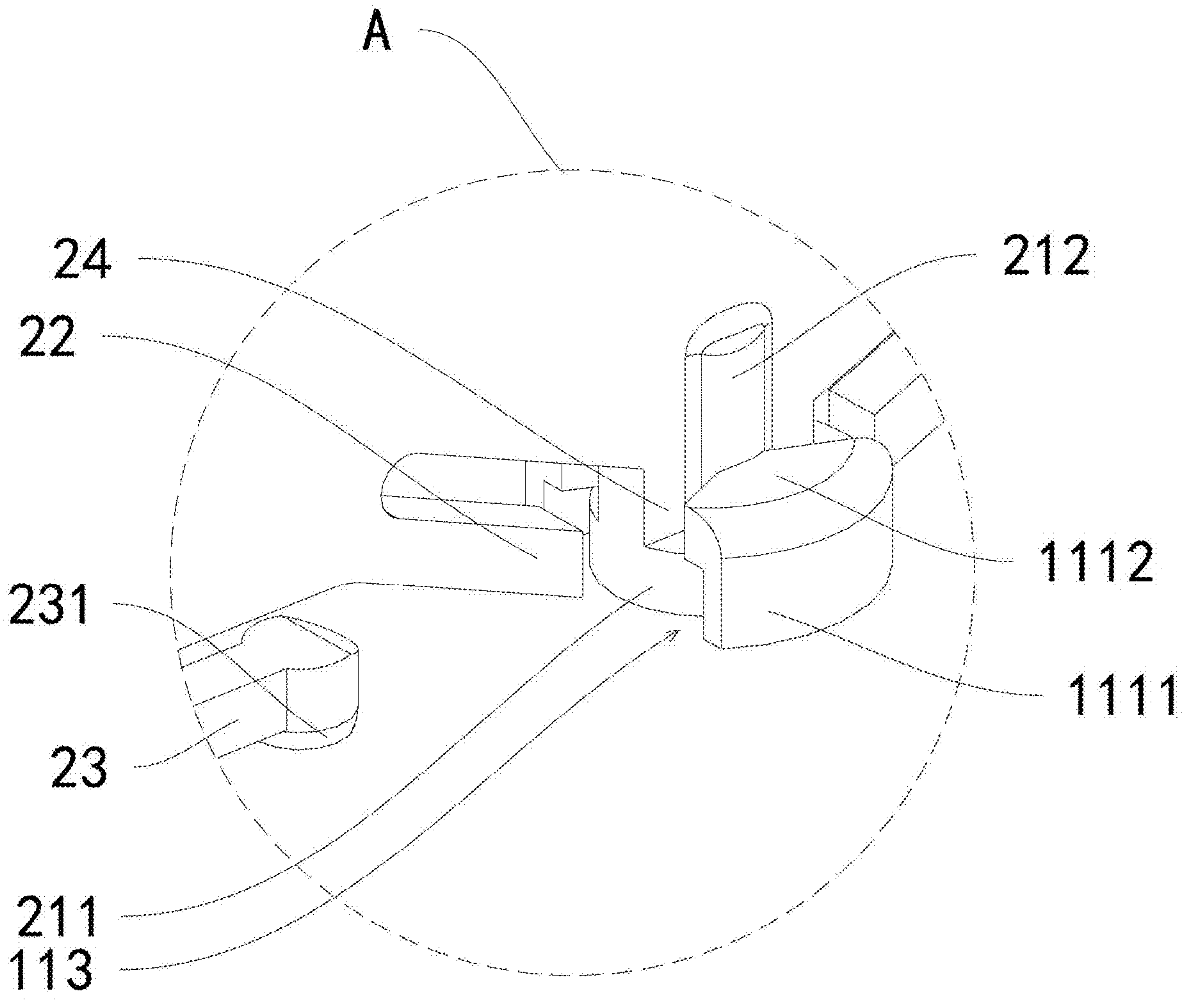
FIG. 2 is an enlarged schematic diagram of position A in FIG. 1.

The technical solutions in the embodiments of the present disclosure will be clearly and completely described below with reference to the drawings in the embodiments of the present disclosure. Obviously, the described embodiments are only part of the embodiments of the present disclosure, not all of the embodiments. Based on the embodiments of the present disclosure, all other embodiments obtained by those ordinary skilled in the art without creative efforts fall within the scope of protection of the present disclosure.

Referring to FIG. 1 to FIG. 7, a rotatable and adjustable isolation structure is shown, which comprises a clamping piece 10 and an isolation piece 20, wherein an end surface of the clamping piece 10 is provided with a rotating base 11, a lower end of the isolation piece 20 is provided with a rotating disk 21, the rotating disk 21 is detachably installed in the rotating base 11, whereby the isolation piece 20 is installed at a rear end of the clamping piece 10; the isolation piece 20 divides the rear end area of the clamping piece 10 into different sections 12, and different cables can correspondingly accommodated in different sections 12, that is, the isolation piece 20 can physically isolate the cables at the rear end of the clamping piece 10 to avoid cross stacking of different cables; the rotating disk 21 can also rotate forward and backward around the central axis of the rotating base 11 to change a shape of the section 12, thereby adapting to uneven cable routing, that is, when the cables in a certain section 12 are stacked in a certain area or in a certain direction, the isolation piece 20 rotates relative to the clamping piece 10 to increase the area where cables are stacked in the section 12, thereby providing sufficient space for cable arrangement.

In some possible embodiments, as shown in FIG. 1 to FIG. 4, FIG. 11 and FIG. 12, the rotating base 11 protrudes from a center of an end surface of the clamping piece 10, and the rotating base 11 also includes a body 111 and a notch 113 formed on one side of the body 111; a rotating cavity 112 that can accommodate the rotating disk 21 is formed inside the body 111, the body 111 can be integrally formed with the clamping piece 10, or can be fixedly installed on the clamping piece 10 by means of bonding or ultrasonic welding; the rotating disk 21 is arranged at the lower end of the isolation piece 20, the rotating disk 21 includes a rotating portion 211, the rotating portion 211 is arranged at the lower end of the isolation piece 20 via a connecting rod 212, and the specific rotating portion 211 can be integrally formed with the isolation piece 20 and fixed to the isolation piece 20 by means of bonding or ultrasonic welding; during assembly, the rotating portion 211 can move from the notch 113 to enter and be accommodated in the rotating cavity 112, human hands can drive the isolation piece 20 to rotate with the rotating portion 211 around the central axis of the rotating cavity 112, thereby adjusting the shape of the section 12 to accommodate cables stacked in a certain area or a certain direction within the section 12.

Figure 10:
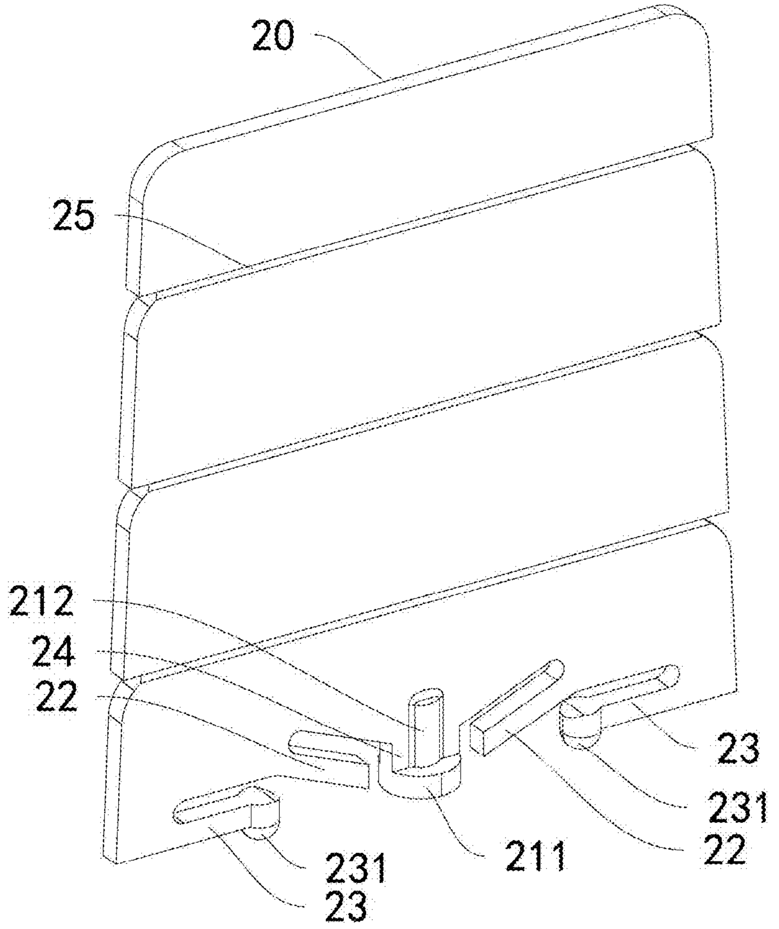
FIG. 10 is a three-dimensional structure diagram of an isolation piece provided by the present disclosure.

In some possible embodiments, as shown in FIG. 10, the rotating portion 211 is in a shape of a cylinder, a ball, a cone or an ellipsoid, and the rotating cavity 112 is also adaptively configured in a shape that can accommodate the rotating portion 211.

Figure 11:
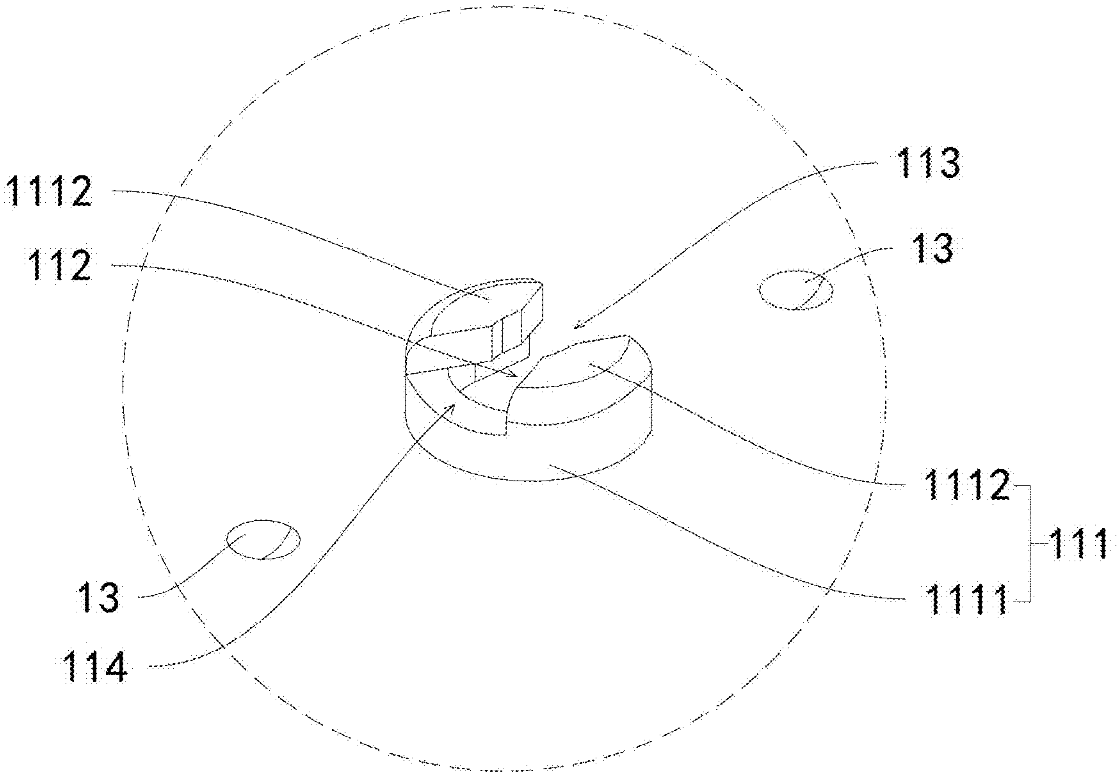
FIG. 11 is a three-dimensional structure diagram of a rotating base portion provided by the present disclosure in a first perspective.
Figure 12:
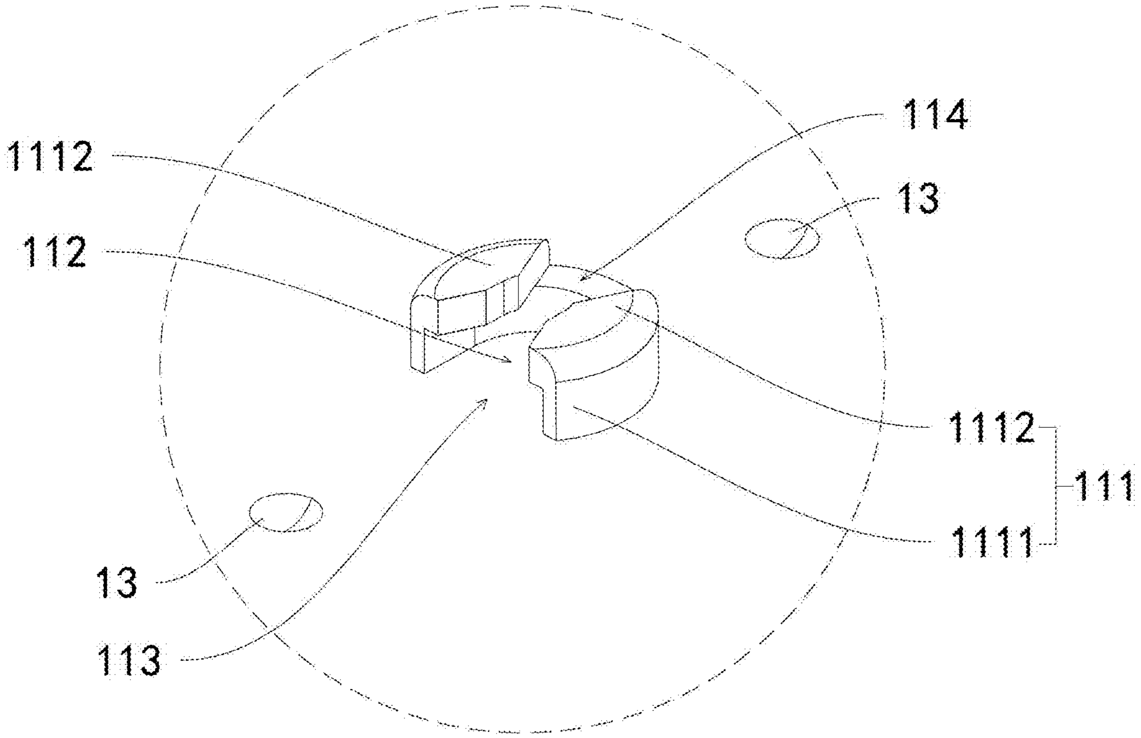
FIG. 12 is a three-dimensional structure diagram of a rotating base portion provided by the present disclosure in a second perspective.

In some possible embodiments, as shown in FIG. 11 and FIG. 12, the body 111 includes a first limiting portion 1111 and a second limiting portion 1112, the first limiting portion 1111 is in a circular shape, and the second limiting portion 1112 is arranged at an upper end of the first limiting portion 1111, so that the area where the first limiting portion 1111, the second limiting portion 1112 and the end surface of the clamping piece 10 are enclosed to form the rotating cavity 112; it should be understood that a guide channel giving way to the connecting rod 212 should also be arranged on the second limiting portion 1112, to ensure that the isolation piece 20 can be inserted into the rotating cavity 112 from the notch 113 along with the rotating portion 211. At this time, the isolation piece 20 should be located above the rotating base 11 to divide the end surface of the clamping piece 10 into different sections 12; after the rotating portion 211 has inserted into the rotating cavity 112, the first limiting portion 1111 can limit the rotating portion 211 from disengaging from the rotating cavity 112 along a width direction of the isolation piece 20, and the second limiting portion 1112 can limit the rotating portion 211 from disengaging from the rotating cavity 112 along a height direction of the isolation piece 20.

In some possible embodiments, as shown in FIG. 1 to FIG. 4 and FIG. 10, in order to prevent the rotating portion 211 from disengaging from the rotating cavity 112 at the notch 113 after assembly, a limiting arm 22 is also formed on the isolation piece 20, the limiting arm 22 extends from a lower end of the isolation piece 20 in an inclined direction downwardly along the width direction of the isolation piece 20 until the limiting arm 22 is close to the rotating portion 211, and a distance between a free end of the limiting arm 22 and the end surface of the clamping piece 10 is less than a height of the first limiting portion 1111 protruding from the end surface of the clamping piece 10. During assembly, the limiting arm 22 moves with the isolation piece 20 first from the rotating portion 211 into the rotating cavity 112 and abuts against an inner side of the first limiting portion 1111, and the limiting arm 22 continues to move with the isolation piece 20 and crosses the first limiting portion 1111 until the free end of the limiting arm 22 is located outside the first limiting portion 1111; when the rotating portion 211 is disengaged from the rotating cavity 112 from the notch 113, the free end of the limiting arm 22 will be abutted against the outside of the first limiting portion 1111, thereby preventing the rotating portion 211 from disengaging from the rotating cavity 112.

In some possible embodiments, as shown in FIG. 1 to FIG. 4 and FIG. 10, a positioning arm 23 is also formed on the isolation piece 20, the positioning arm 23 extends from the lower end of the isolation piece 20 along the width direction of the isolation piece 20, a free end of the positioning arm 23 is provided with a positioning portion 231. After assembly, the positioning portion 231 is elastically and press against the end surface of the clamping piece 10, that is, the friction between the positioning portion 231 and the end surface of the clamping piece 10 is used to inhibit the tendency of the isolation piece 20 to rotate relative to the clamping piece 10; further, the end surface of the clamping piece 10 is provided with a positioning groove 13 that matches the positioning portion 231, the isolation piece 20 rotates relative to the clamping piece 10 until the positioning portion 231 snaps into the positioning groove 13, further strengthening the resistance of the isolation piece 20 to rotate relative to the clamping piece 10, and preventing the isolation piece 20 from rotating relative to the clamping piece 10 due to some external force after assembly.

In some possible embodiments, as shown in FIG. 1 to FIG. 4 and FIG. 10, a reinforcing rib 24 is also formed on the isolation piece 20, and the reinforcing rib 24 extends along the width direction of the isolation piece 20 opposite to both sides of the connecting rod 212, which aims to enhance the structural strength of the isolation piece 20 and the rotating portion 211.

Figure 3:
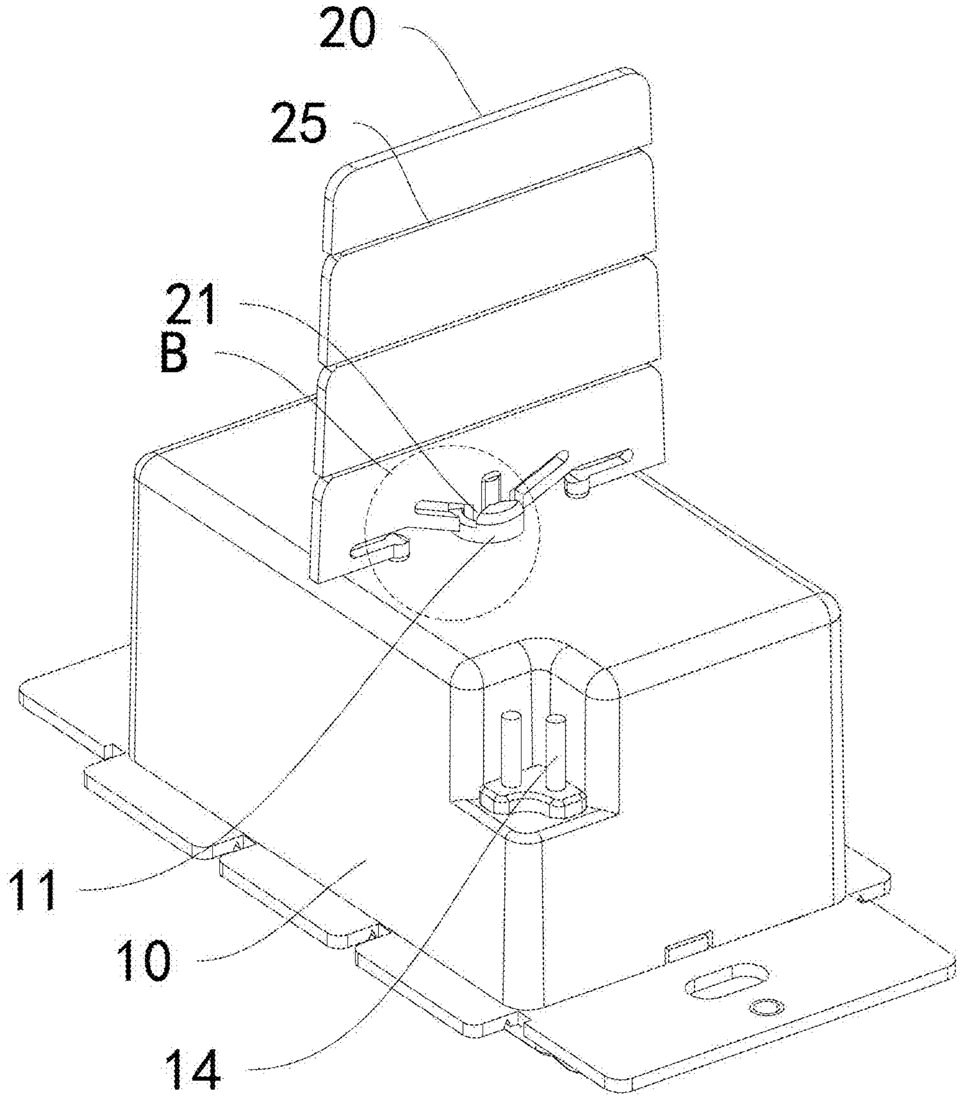
FIG. 3 is a three-dimensional structure diagram from a second perspective provided by the present disclosure.
Figure 4:
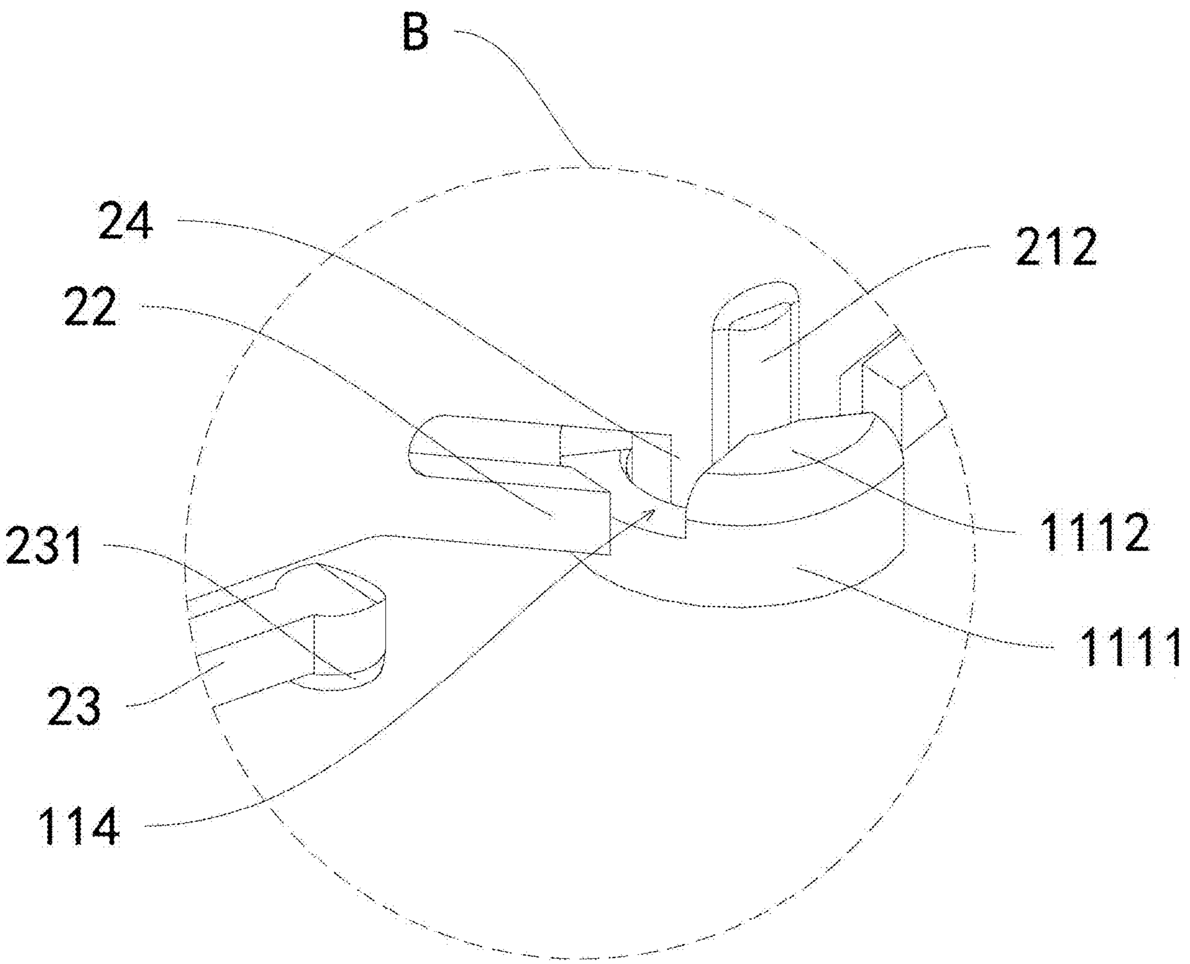
FIG. 4 is an enlarged schematic diagram of position B in FIG. 3.

In some possible embodiments, as shown in FIG. 1, FIG. 3 and FIG. 10, a plurality of easy-tear lines 25 is formed on the isolation piece 20, and the easy-tear lines 25 are arranged at intervals along the width direction of the isolation piece 20, which aims to adjust the height size of the isolation piece 20 according to the depth of the adapted junction box 30 or the rear housing.

Figure 5:
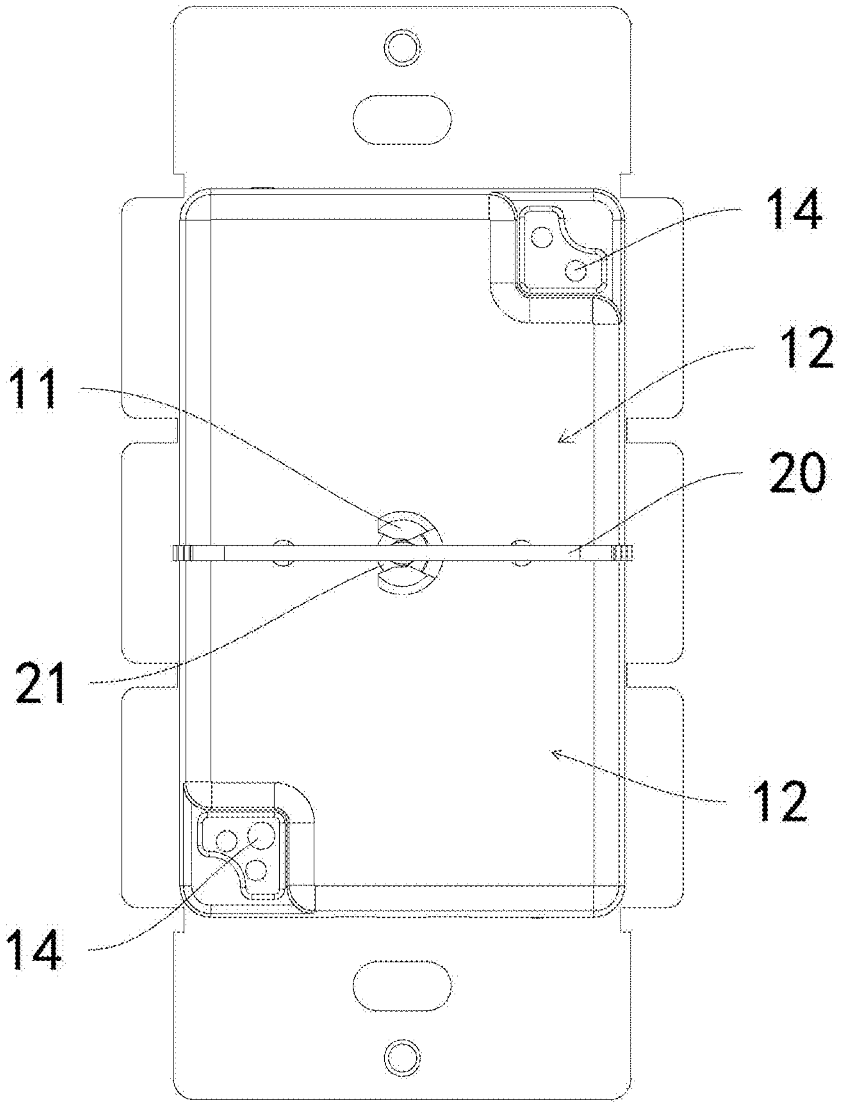
FIG. 5 is a structural top view of an isolation piece is rotated to a first position relative to a clamping piece provided by the present disclosure.
Figure 6:
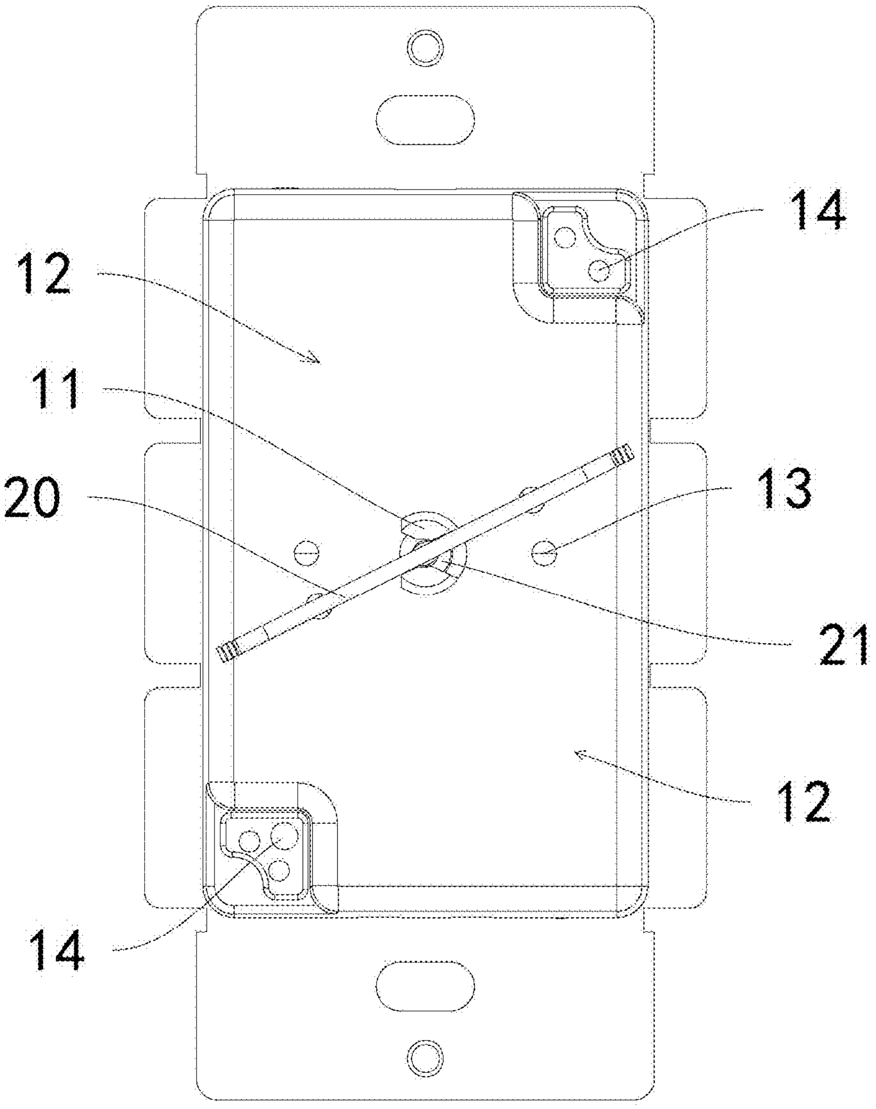
FIG. 6 is a structural top view of an isolation piece is rotated to a second position relative to a clamping piece provided by the present disclosure.
Figure 7:
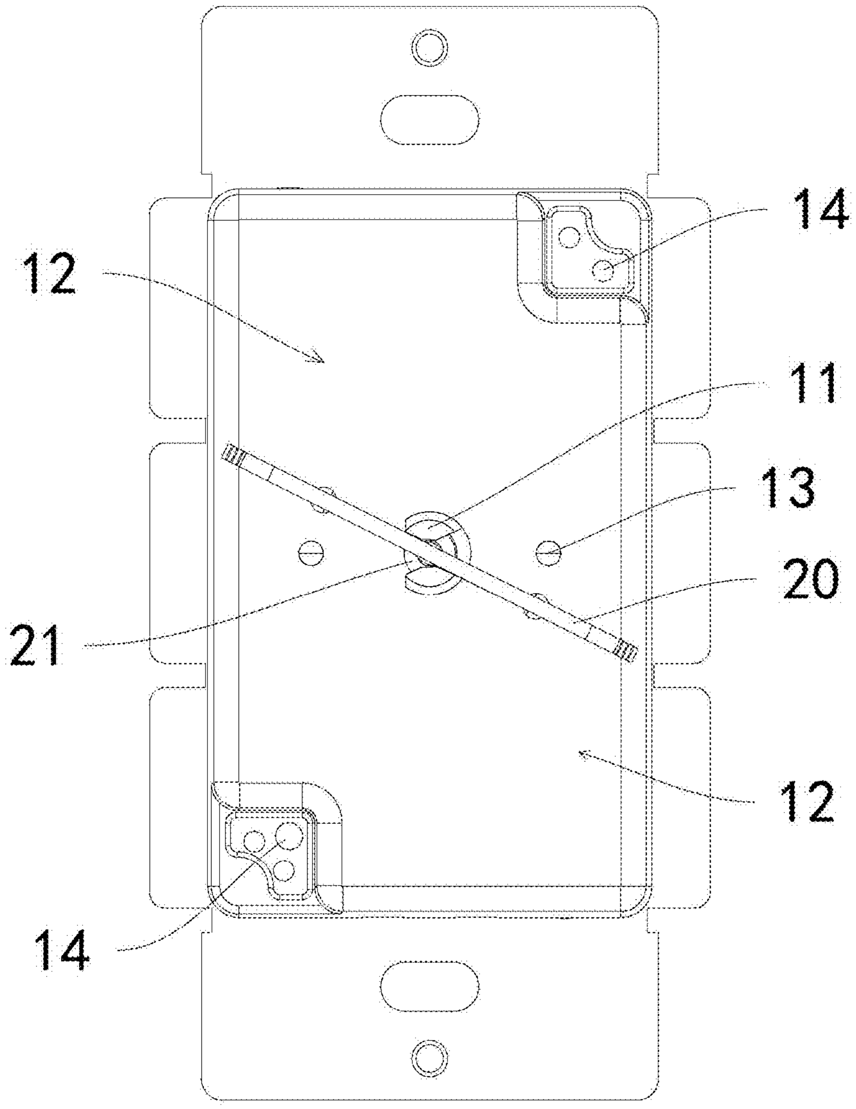
FIG. 7 is a structural top view of an isolation piece is rotated to a third position relative to a clamping piece provided by the present disclosure.

It should be noted that, as shown in FIG. 1 to FIG. 4, when the limiting arm 22 rotates with the isolation piece 20 to the same side as the notch 113, the rotating portion 211 can still be disengaged from the rotating cavity 112 at the notch 113. To avoid this situation, two limiting arms 22 should be provided and the two limiting arms 22 are distributed on both sides of the rotating portion 211 along the width direction of the isolation piece 20. In this way, in most cases, the limiting arms 22 are located on the opposite side of the notch 113, thereby limiting the rotating portion 211 from disengaging from the rotating cavity 112. Furthermore, as shown in FIG. 5, the isolation piece 20 is arranged along the width direction of the clamping piece 10, and when the isolation piece 20 is rotated and arranged along the length direction of the clamping piece 10, neither of the two limiting arms 22 is on the side opposite to the notch 113, that is, the limiting arms 22 are unable to play a role in preventing the rotating portion 211 from disengaging from the rotating cavity 112; in order to avoid this situation, the rotation angle of the isolation piece 20 relative to the clamping piece 10 should be limited, specifically, a gap 114 is formed on the side opposite to the notch 113 on the second limiting portion 1112, and the reinforcing rib 24 can only rotate back and forth with the rotating portion 211 in the gap 114; at this time, the isolation piece 20 cannot rotate and is arranged along the length direction of the clamping piece 10, that is, a limiting arm 22 is always located on the side opposite to the notch 113, so as to ensure that the rotating portion 211 cannot be disengaged from the rotating cavity 112 after assembly.

Figure 8:
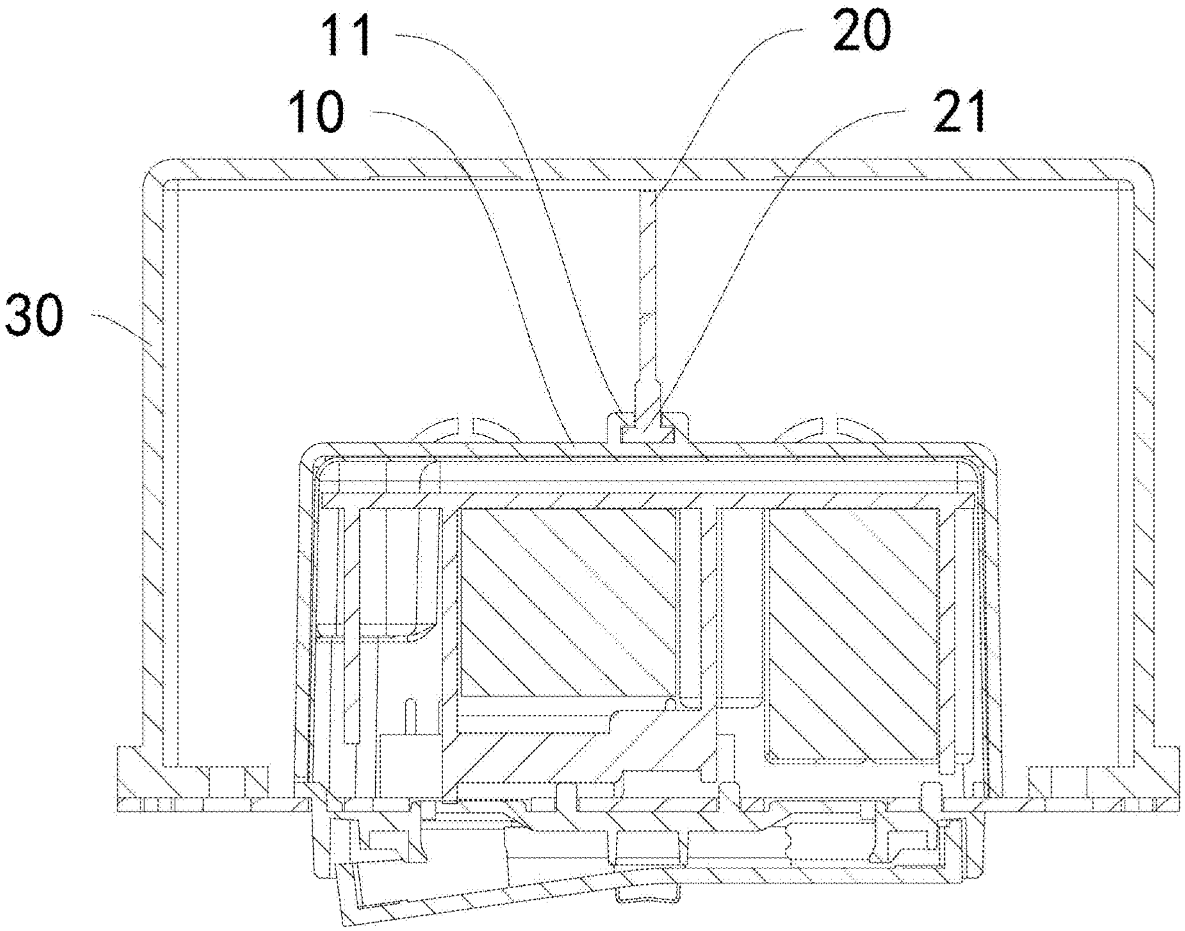
FIG. 8 is a section diagram of an electrical device provided by the present disclosure in a first direction.
Figure 9:
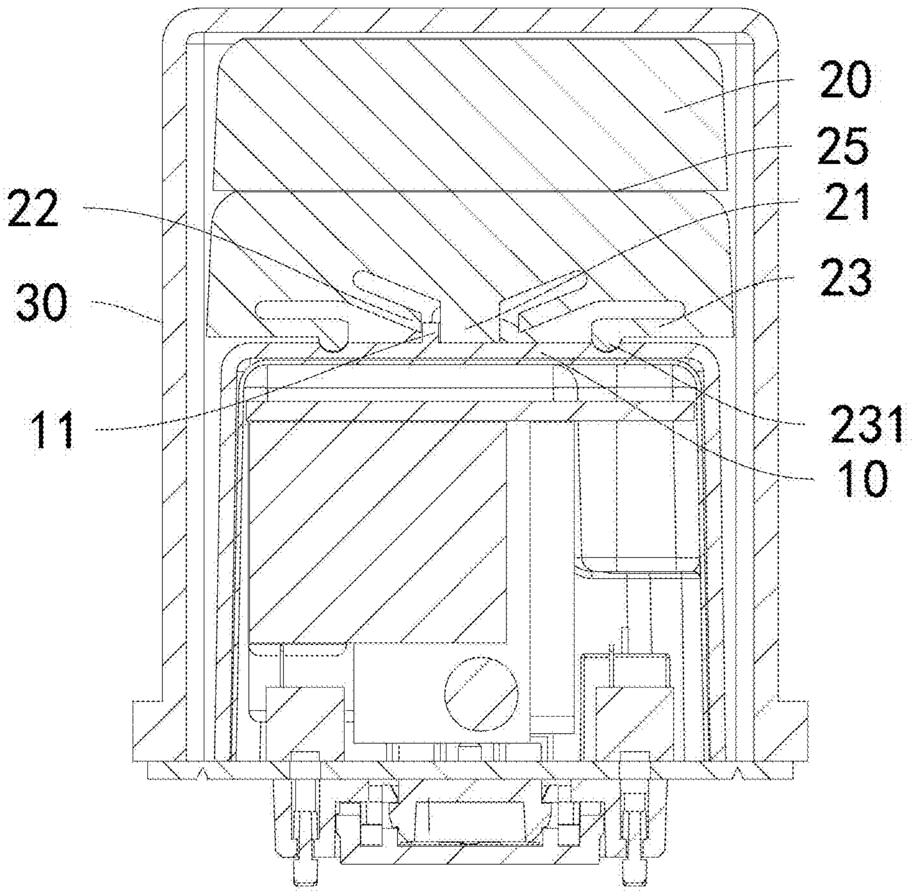
FIG. 9 is a section diagram of an electrical device provided by the present disclosure in a second direction.

The present disclosure also provides an electrical device, as shown in FIG. 8 and FIG. 9, which includes a rotatable and adjustable isolation structure as in the above embodiment, and also includes a junction box 30, the clamping piece 10 is accommodated in the junction box 30, and a cavity that can accommodate cables is formed between a rear end surface of the clamping piece 10 and a bottom of the junction box 30, at least two terminals 14 are formed on the rear end surface of the clamping piece 10, and at least two of the terminals 14 are arranged within the different sections 12, in this embodiment, one terminal 14 is connected to the input cable, and the other terminal 14 is connected to the output cable. The isolation structure is used to separate the input cable and the output cable to avoid potential security risks caused by cross stacking of the input cable and the output cable.

The above are only specific embodiments of the present disclosure, but the protection scope of the present disclosure is not limited to this, and any change or substitutions within the technical scope disclosed by the present disclosure shall be covered within the protection scope of the present disclosure. Therefore, the protection scope of the present disclosure should be subject to the protection scope of the claims.

What is claimed is:

1. A rotatable and adjustable isolation structure, comprising:

- a clamping piece, wherein a rotating base is formed on the clamping piece; and
- an isolation piece, wherein one end of the isolation piece is detachably connected to the rotating base via a rotating disk, whereby the isolation piece divides one side area of the clamping piece into different sections, and the isolation piece rotates around a central axis of the rotating base with the rotating disk to change a shape of the section.

2. The rotatable and adjustable isolation structure according to claim 1, wherein the rotating base protrudes from a center of one end of the clamping piece, and the rotating base includes:

- a body, wherein a rotating cavity is formed inside the body;
- a notch, wherein the notch is formed on one side of the body and communicates with the rotating cavity;

the rotating disk includes:

- a rotating portion, wherein the rotating portion is arranged at one end of the isolation piece via a connecting rod; and
- the rotating portion enters from the notch and is accommodated in the rotating cavity.

3. The rotatable and adjustable isolation structure according to claim 2, wherein the rotating portion is in a shape of a cylinder, a ball, a cone or an ellipsoid.

4. The rotatable and adjustable isolation structure according to claim 2, wherein the body includes:

- a first limiting portion, wherein the first limiting portion is in a circular shape and is formed on the clamping piece;

a second limiting portion, wherein the second limiting portion is arranged at an upper end of the first limiting portion;

the first limiting portion, the second limiting portion and an end surface of the clamping piece are enclosed to form the rotating cavity;

the first limiting portion is used to limit the rotating portion from disengaging from the rotating cavity along a width direction of the isolation piece; and the second limiting portion is used to limit the rotating portion from disengaging from the rotating cavity along a length direction of the isolation piece.

5. The rotatable and adjustable isolation structure according to claim 4, wherein a limiting arm is further formed on the isolation piece, the limiting arm extends from a lower end of the isolation piece in an inclined direction downwardly along the width direction of the isolation piece until the limiting arm is close to the rotating portion, a distance between a free end of the limiting arm and the end surface of the clamping piece is less than a height of the first limiting portion protruding from the end surface of the clamping piece, and the limiting arm is abutted against an outer surface of the first limiting portion to prevent the rotating portion from disengaging from the rotating cavity through the notch.

6. The rotatable and adjustable isolation structure according to claim 1, wherein a positioning arm is further formed on the isolation piece, the positioning arm extends from the lower end of the isolation piece along the width direction of the isolation piece, a free end of the positioning arm is provided with a positioning portion, and the positioning portion is elastically and press against the end surface of the clamping piece to prevent the isolation piece from rotating relative to the clamping piece.

7. The rotatable and adjustable isolation structure according to claim 6, wherein the end surface of the clamping piece is provided with a positioning groove that matches the positioning portion.

8. The rotatable and adjustable isolation structure according to claim 2, wherein a reinforcing rib is further formed on the isolation piece, and the reinforcing rib extends along the width direction of the isolation piece opposite to both sides of the connecting rod.

9. The rotatable and adjustable isolation structure according to claim 1, wherein a plurality of easy-tear lines is formed on the isolation piece, and the easy-tear lines are arranged along the width direction of the isolation piece.

10. An electrical device, wherein it comprises the rotatable and adjustable isolation structure according to claim 1, at least two terminals are formed on the clamping piece, and at least two of the terminals are arranged within the different sections;

the electrical device further comprises:

a junction box, the clamping piece is accommodated in the junction box, a cavity that can accommodate cables is formed between the clamping piece and the junction box, and the isolation piece divides the cavity into the different sections.

* * * * *